Patented Apr. 5, 1932

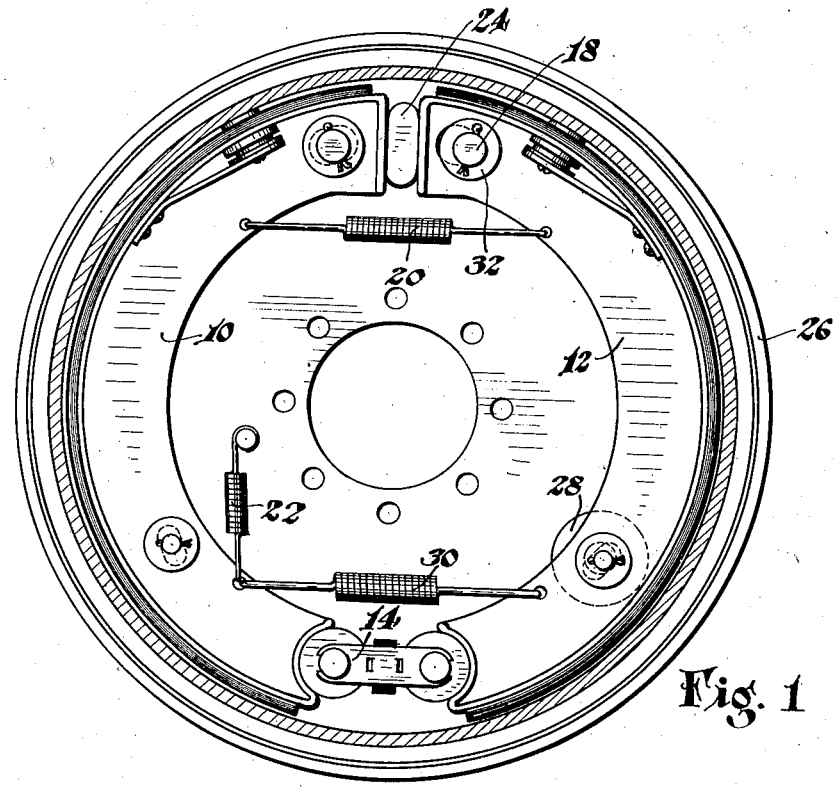
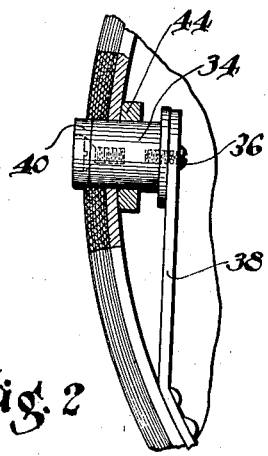
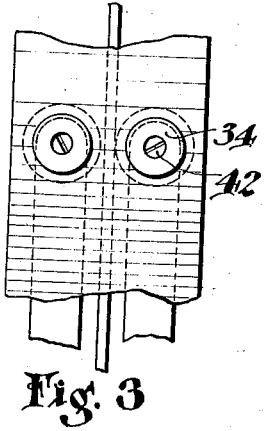
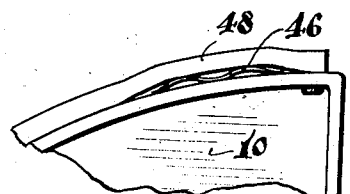
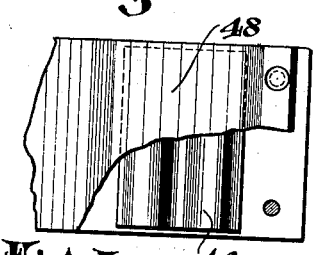
INVENTOR.
Vincent Bendix
BY H. O. Clayton
ATTORNEY.

1,852,103

UNITED STATES PATENT OFFICE

VINCENT BENDIX, OF CHICAGO, ILLINOIS, ASSIGNOR TO BENDIX BRAKE COMPANY, OF SOUTH BEND, INDIANA, A CORPORATION OF ILLINOIS

BRAKE

Application filed December 13, 1928. Serial No. 325,744.

This invention relates to brakes and is illustrated as embodied in an internal expanding brake for automotive vehicles.

In brakes of this type wherein the friction means is floating with respect to the backing plate or other brake support, anchor posts are usually positioned adjacent each other at one side of the drum to take the braking torque in either direction of drum rotation and the applying means is usually interposed between these anchors.

Now with such a construction there is sometimes a very objectionable click of the brake when the same is applied, which click is due to one or the other of the ends of the friction means contacting violently with the anchor post when the brake is first applied. My invention is designed to obviate this objectionable feature and to that end I have devised a yieldable supplementary means adjacent each end of the friction means constructed and arranged to contact the drum prior to the application of the friction means proper.

In the embodiment illustrated, I suggest that a button or small circular disk be spring pressed through correspondingly shaped orifices in the ends of the rim of the shoe, which disk is to be covered with suitable friction material. As an alternative means for accomplishing the same end, I may insert a small corrugated slip between the lining and the rim of the shoe to provide a raised lining portion.

The above and other objects and features of the invention, including various novel and desirable details of construction, will be apparent from the following description of the illustrative embodiments shown in the accompanying drawings, in which:

Figure 1 is a view of a floating brake structure embodying my invention, the section being taken just inside the head of the drum;

Figures 2 and 3 are section and plan views indicating in detail my novel supplemental friction structure; and Figures 4 and 5 are views similar to Figures 2 and 3 indicating a modified form of my invention.

As illustrated in Figures 1, 2 and 3 the floating brake structure may comprise T-sectioned brake shoes 10 and 12 which may be articulated at 14 by an adjustable floating pivot; slotted at their ends to accommodate the anchor posts 18; and applied, against the resistance of return springs 20 and 22, by a suitable floating double cam 24 acting on the ends of the shoes. The brake is supported by a backing plate 26 or other equivalent support to which the anchor posts and the spring 22 are secured. A suitable eccentric stop 28 aids in determining the idle position of the friction means, tension spring 30 serves to maintain the parts in close contact at the floating pivot 14, and washers 32 on the ends of the anchor posts confine the shoes laterally.

Adjacent the anchored end of each shoe are provided cylindrical elements 34 securely fastened, as by screws 36, to spring clips 38, the latter being securely fastened as by rivets to the under side of the rim of the shoe. As indicated in Figure 3, I prefer to provide two such elements on each shoe, one on each side of the web thereof, both protruding through openings in the rim. Each such supplemental friction element is provided with a suitable friction face protruding slightly beyond the face of the shoe, which face may consist of a small disk 40 of the conventional lining secured in place by screw 42 or in lieu thereof I may coat the face of the element with any suitable wear resisting metal such as any of the well known steel alloys. A suitable washer 44 secured to the under side of the rim surrounds the friction element to guide the same in its movement.

I prefer to so proportion the parts of my brake that with the same in released position a clearance is maintained between the face of the elements 34 and the drum face thus obviating the inevitable drag and quick wear which would ensue should the same be in constant drum contact.

If desired, only one set of the supplemental friction elements may be employed and I prefer that, if such a single set be used, they be placed to the left of the cam in Figure 1 to aid in the anchoring function with forward braking, the drum turning counterclockwise on a left front wheel.

In operation actuation of the cam in applying the brake results in forcing apart the ends of the shoes. The protruding friction elements 34 immediately contact with the drum and the wiping action thereof rotates the connected shoes into anchoring engagement with one or the other of the fixed anchor posts 18 depending on the direction of drum rotation. Due to the relatively limited area of these friction elements the friction developed is small, consequently the movement of the shoes is relatively slow, resulting in an easy and comparatively noiseless anchoring of the shoes. Furthermore the yielding action of the spring clips offsets the applying action of the cam thereby lowering the pressure of the disks 40 on the drum resulting in less friction and easier anchoring. Continued movement of the cam with the increase in pressure of the elements 34 against the drum results in their being depressed flush with the lining of the shoes against the resistance of the spring clips. Thereafter the anchored brake functions normally, the full area of the lining contacting the drum.

In Figures 4 and 5 I have shown an alternative structure for accomplishing the same result, in which a relatively narrow corrugated clip or shim 46 is inserted between the lining and the rim of the shoe adjacent the end thereof. This results in a slightly raised portion 48 at each end of the friction device, which first contacts the drum with application of the brake to function in a manner previously described. Subsequent cam pressure flattens the corrugated spring to thereafter present the full lining face to the drum, the shoes then functioning as a normal brake.

While but two embodiments of my invention have been disclosed and described in detail, it is not my intention to limit the scope of the invention thereto or otherwise than by the scope of the terms of the appended claims.

I claim:

1. A brake comprising, in combination, a drum, a floating friction device within said drum having spaced ends, anchoring means adjacent each end and applying means adjacent said ends, together with supplemental means on the outer face of said friction device at one end thereof constructed and arranged to contact the drum, prior to the contacting engagement of the friction means proper, whereupon one or the other of the spaced ends of said device will anchor on one or the other of said anchors prior to complete application of the brake.

2. A brake comprising, in combination, a drum, a floating friction device cooperating with the drum adapted to selectively anchor on one or the other of its ends, and spring-pressed means on the respective ends of said device functioning to determine the end to be anchored.

3. A brake comprising, in combination, a drum, a friction device including a plurality of articulated floating shoes cooperating with the drum, said device arranged to anchor on one shoe when the drum is turning in one direction and on the other shoe when the drum is turning in the other direction and spring pressed supplemental friction means on one of said shoes adjacent its anchoring end.

4. A brake comprising a drum, a friction device cooperating with said drum, said device provided with spring-pressed supplemental friction means at one end thereof to aid in anchoring the same.

5. A brake mechanism including a friction element provided with a drum contacting face, and further provided with means protruding beyond the normal outline of said face adapted to be depressed flush with the face.

6. A brake mechanism including a drum, an applying element, a friction element provided with a drum contacting face adapted to be actuated by the applying element, spring-pressed means protruding beyond the normal outline of said face adapted to be depressed flush with the face upon application of said applying element.

7. A brake mechanism including a drum, an applying element, a friction element provided with a drum contacting face adapted for engagement with the drum and spring-pressed means extending through and normally protruding beyond the outline of said face adapted to be depressed flush therewith upon application of said applying element to said friction element.

8. A brake structure comprising a friction element having at one end thereof spaced yieldable protuberances.

9. A brake comprising a friction element having a rim, a lining on the rim and a shim interposed between the rim and the lining at one end of the friction element providing a relatively narrow raised portion in the lining.

In testimony whereof, I have hereunto signed my name.

VINCENT BENDIX.